March 1, 1966          M. BÖHLER          3,237,828
APPARATUS FOR REMOVING THE COVERING LAYERS
FROM WELDING ELECTRODES
Filed Jan. 22, 1965
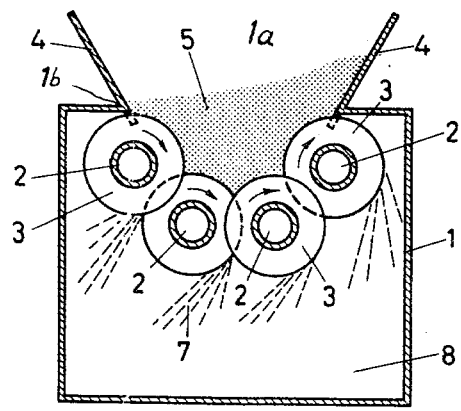
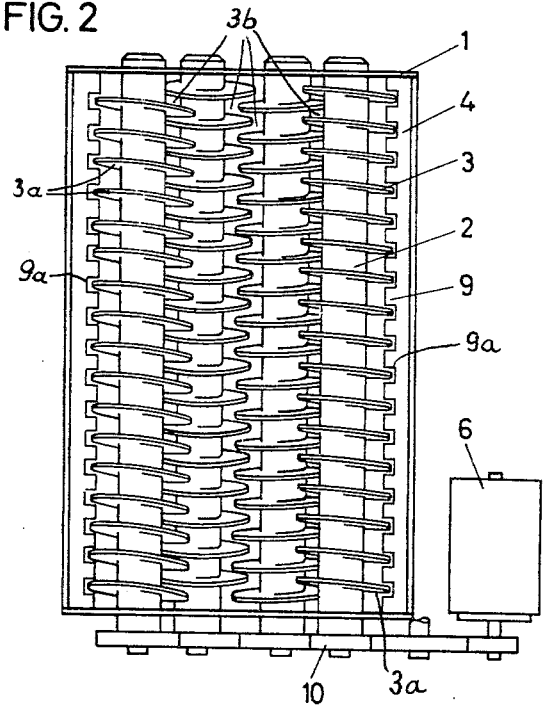
INVENTOR.
Max Böhler
ATTORNEY

United States Patent Office 3,237,828
Patented Mar. 1, 1966

3,237,828
APPARATUS FOR REMOVING THE COVERING LAYERS FROM WELDING ELECTRODES
Max Böhler, Zurich, Switzerland, assignor to Holding Intercito S.A., Zurich, Switzerland
Filed Jan. 22, 1965, Ser. No. 427,395
Claims priority, application Switzerland, Feb. 10, 1964, 1,529/64
8 Claims. (Cl. 225—97)

The present invention has reference to an improved apparatus for removing the covering layers or coatings from welding electrodes.

Electrode de-coating machines are already known to the art which are employed for removing the covering material or coating from the wire of the electrode when the electrode must be eliminated ahead of time from the manufacturing process for any of various reasons. For example, such may be the case if the electrode covering has been applied unevenly to the wire, or if the electrode covering, which as is known typically consists of a plastic mass, has been damaged. With such known machines the cover material, hereinafter generally referred to as "electrode covering or electrode coating" is mechanically pressed-off from the wires by nozzles and/or rollers. Extruded-type electrodes which are to be rejected from the manufacturing process may also be immersed in a lye liquor in order to chemically detach the electrode covering from the wire. In the case of electrode covering-removal machines equipped with nozzles and/or rollers the electrodes must be individually manually inserted into the machine. Quite obviously this requires a great expenditures of labor. A further drawback of these machines is the fact that a remnant of the electrode covering always clings to the surface of the wire, necessitating an additional cleaning process before the wires can again be used. With chemical removal of the electrode covering from the wire the disadvantage which exists is that the removal electrode covering cannot again be used for the production of new extruded type electrodes.

Accordingly, a primary object of the present invention is directed to the provision of an improved apparatus for removal of the covering layers from welding electrodes which, on the one hand, avoids these disadvantages and, on the other hand, combines the advantages of the two known techniques of removing the electrode covering from the wire previously mentioned.

A further very important object of this invention concerns an improved apparatus for removing the electrode covering from its associated wire in a highly efficient and reliable manner, the electrodes being capable of introduction into the apparatus continuously or at least batchwise, at any rate, need not be inserted individually.

Another noteworthy object of the present invention is the construction of an improved apparatus for removing the covering layers from welding electrodes in a very quick and efficient manner, the apparatus itself being of realtively simple construction, not readily subject to jamming or other malfunctions, requiring a minimum of supervision, and of exceptional importance, can process a plurality of electrodes at the same time.

The present invention is generally characterized by the feaures that there is provided a housing in which there is arranged at least two rotors equipped with wobble or swash plates. The rotors which carry the swash plates are arranged axially parallel with another and are arranged with respect to one another such that the wobble plates of adjacent rollers overlap and that the rotors form at least a part of a trough for receiving the welding electrodes to be processed. Due to this described physical structure the electrode covering is completely removed from the wires. Furthermore, the covering material as well as the wires may be re-used. Moreover, the covering-removal apparatus of the present invention can be charged with bundles or groups of electrodes, i.e., batchwise and the electrodes no longer need be inserted into the machine individually. These advantages reduce the losses of wire and covering material to a minimum.

Other features, objects and advantages of the present invention will become apparent by reference to the following detailed description and drawing in which:

FIGURE 1 is a vertical cross-section through a preferred embodiment of electrode covering-removal apparatus designed according to the teachings of the present invention; and FIGURE 2 is a top plan view of the apparatus of FIGURE 1 including the drive.

Describing now the drawing, it will be recognized that a number of rotors or shafts 2, in the present embodiment totaling four in number, are arranged in a machine frame or housing 1 in such a manner that they form an electrode-receiving trough 1a with both of the side plates 4. These side plates 4 extend through an opening 1b provided at the top of the housing 1 and incorporate a plurality of spaced recesses 9 at their respective lower end which extend along the length of the corresponding side plate 4. Wobble plates 3 are evenly distributed along the whole length of the rotors 2. It will be appreciated that the wobble plates 3 embody disk-like members or plates 3a fixedly connected with and arranged obliquely on their respective rotor 2, in other words extend at an inclination to the axis of rotation of the associated rotor. Due to the just-described manner of mounting of the disk-like members 3a and the rotation of the supporting rotor 2 such disk-like members function in the manner of wobble plates. Moreover, the wobble plates 3 of a given rotor overlap with those of an neighboring rotor. In other words, the wobble plates 3 of one rotor extend into the spaces 3b formed between the wobble plates of the neighboring rotor or rotors, yet are spaced from the bounding walls or surfaces 9a of these recesses 9.

The welding electrodes 5 from which the covering is to be removed are laid batchwiese or bundlewise into the electrode-receiving trough 1a. As a result, these electrodes 5 come to lie on the wobble plates 3 and are evenly processed by these wobble plates so that the electrode covering is pressed-off and falls between the rotors 2 into the collecting chamber or compartment 8 disposed beneath such rotors 2 and within the housing 1. The removed covering material has been generally designated by reference numeral 7. The wobble plates 3 of the two outermost rotors 2 are arranged at the ends of the side plates 4 in such a manner that they project into the recesses 9 thereof, thereby assuring that the electrodes 5 cannot fall down between the side plates 4 and the rotors 2 during operation.

These rotors 2 are advantageously unidirectionally driven by means of a drive motor 6. A driving means, such as either a gear train or a chain, generally designated by reference numeral 10, is operably arranged between the drive motor 6 and the rotors 2. Due to the synchronous rotation of the rotors 2 and thereby also of the wobble plates 3 there is effected rotation of the electrodes 5 about their own axis. At the same time these electrodes 5 are slightly displaced in lengthwise direction so that their entire surface at some time or other comes into contact with the wobble plates 3. As a result, the surface of the elctrodes is simultaneously contacted in both axial and radial direction and the electrode covering effectively removed. Furthermore, the described arrangement of the rotors and wobble plates 3 ensures that the entire group of electrodes 5 in the trough 1a is thoroughly agitated so that all electrodes eventually come into contact with said wobble plates. If desired, it would be possible to slightly downwardly incline the rotors 2 and to provide an exit opening for the elctrodes which have had their covering removed at an end wall of the housing 1, so that those electrodes which bear against the wobble plates 3 are gradually urged through the exit opening and a further group of not yet processed electrodes then comes to bear against the wobble plates 3.

It will be understood that the covering material that has fallen into the collecting chamber 8 can be re-used for the production of new welding electrodes. The welding electrodes 5 from which the covering has been completely removed can then also be re-introduced into the manufacturing process.

While there is shown and described a present preferred embodiment of the invention it is to be distinctly understood that the invention is not limited thereto but may be otherwise variously embodied and practised within the scope of the following claims.

What is claimed is:

1. Apparatus for removing the covering layer from welding electrodes comprising a housing, at least two rotors which are substantially axially parallel mounted for rotation in said housing, wobble plates carried by said rotors, said rotors being arranged with respect to one another such that the wobble plates of neighboring rotors overlap and that said rotors form at least a portion of a trough for receiving the electrodes to be processed.

2. Apparatus for removing the covering layer from welding electrodes as defined in claim 1 wherein at least four rotors are provided, the two outermost of which are upwardly displaced within said housing.

3. Apparatus for removing the covering layer from welding electrodes as defined in claim 1 wherein said housing is provided at its upper end with an opening, a pair of side plates extending into said opening and forming together with said rotors the trough for receiving the electrodes to be processed, the lower end of each side plate extending through said opening into said housing and being provided with a plurality of spaced recesses, the outermost rotors having their wobble plates extending into said spaced recesses of an associated side plate.

4. Apparatus for removing the covering layer from welding electrodes as defined in claim 3 wherein said wobble plates extending into said spaced recesses are distanced from the bounding walls of said recesses.

5. Apparatus for removing the covering layer from welding electrodes as defined in claim 4 wherein said wobble plates are rigidly connected with their associated rotor.

6. Apparatus for removing the covering layer from welding electrodes as defined in claim 5 further including drive means for driving said rotors in the same direction of rotation.

7. Apparatus for removing the covering layer from welding electrodes comprising a housing, at least two rotors mounted for rotation in said housing, a plurality of disk-like members spacedly arranged axially of each rotor, each of said disk-like members being arranged obliquely with respect to the axis of rotation of its associated rotor, said rotors being disposed with respect to one another such that the disk-like members of one rotor extend into the spaces between respective adjacent disk-like members of a neighboring rotor, said rotors cooperating with one another to form at least a portion of a trough for receiving the electrodes to be processed.

8. Apparatus for the removing the covering layer from welding electrodes comprising a housing, at least two rotors mounted for rotation, a plurality of disk-like members spacedly arranged axially and fixedly connected with each rotor, each of said disk-like members being disposed at an inclination to the lengthwise axis of its associated rotor, said rotors being disposed with respect to one another such that the disk-like members of one rotor extend into the spaces between respective adjacent disk-like members of a neighboring rotor.

No references cited.

WILLIAM W. DYER, JR., *Primary Examiner.*

J. M. MEISTER, *Assistant Examiner.*